Figure 1:
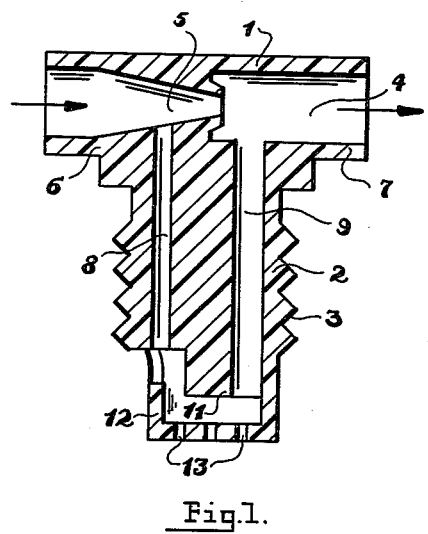

Nov. 6, 1962

H. C. RIGGS 3,062,229

BATTERY FILLING AND VENTING DEVICE

Filed Dec. 21, 1959

INVENTOR.

HAROLD C. RIGGS

BY

ATTORNEY

United States Patent Office 3,062,229
Patented Nov. 6, 1962

3,062,229
BATTERY FILLING AND VENTING DEVICE
Harold C. Riggs, Langhorne Manor, Pa., assignor to The Electric Storage Battery Company, a corporation of New Jersey
Filed Dec. 21, 1959, Ser. No. 860,970
12 Claims. (Cl. 137—260)

The present invention generally relates to a filling and venting device for storage batteries. More specifically the present invention is concerned with a device which is particularly adapted as a vent plug which facilitates the addition of water to the cells of a storage battery to replenish the water lost from the electrolyte during battery operation.

The necessity of maintaining the proper level of electrolyte within the cells of the battery is well known. Operation of a battery with insufficient electrolyte lessens the efficiency of a battery and if continued for prolonged periods of time a battery may be rendered unserviceable. As a result of the constant loss of water from the electrolyte during battery operation by evaporation and dissociation, water must be periodically added to a battery to insure its proper operation. In many applications such as in diesel locomotive, however, storage batteries are often mounted in such a manner as to make periodic servicing extremely difficult and time consuming. In addition, the present trend toward the use of batteries having higher voltages and hence a larger number of cells serves to further complicate the servicing problem.

Accordingly, it is an object of the present invention to provide a new and improved vent plug for storage batteries which will permit the addition of water to a battery cell without the removal of the vent plug.

Another object of the present invention is to provide a vent plug for storage batteries which will facilitate the addition of water to battery cells and automatically carry off excess water when the electrolyte within the cell is brought to the proper level.

Still another object of the present invention is to provide a vent plug for storage batteries which can be connected to other similar vent plugs used on the battery to permit the simultaneous addition of water to all the cells of the battery without the removal of any of the vent plugs.

A further object of the present invention is to provide means in a battery vent plug of the type described to minimize the dilution of an electrolyte when excess water is removed from the cell after the electrolyte is brought to a predetermined level.

A still further object of the present invention is to provide a vent plug which will accomplish the aforementioned objects without moving parts and which is characterized by simplicity of construction and reliability of performance.

The various objects of the present invention are achieved in a vent plug which is provided with a water flow passage which extends through the top portion of the vent plug and which is adapted for connection to a source of water. A pair of vertical passages in the base of the vent plug connect the water flow passage with the cell compartment of the battery. One of the vertical passages serves the dual purposes of a gas vent and a water input passage and the other vertical passage functions as an excess water evacuation passage. To this end, the water flow passage is provided with a constriction or nozzle which terminates at the water evacuation passage. Thus, when water flows through the water flow passage an aspirator is formed which draws any excess water supplied to the battery out of the cell compartment through the excess water evacuation passage. The vent plug is adapted for interconnection with other similar vent plugs to provide for the simultaneous addition of water to a plurality of battery cells. Means are also provided to maintain a preferred electrolyte level and to minimize electrolyte dilution.

Figure 2:
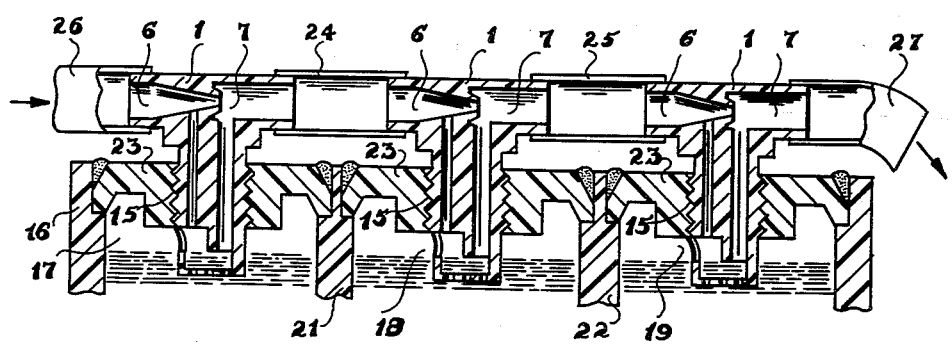

A better understanding of the present invention may be had from the following description when read with reference to the accompanying drawings of which:

FIG. 1 is a vertical section of a vent plug in accordance with the present invention; and FIG. 2 is a vertical section of a plurality of vent plugs in accordance with the present invention in use in a storage battery and interconnected to facilitate the simultaneous filling of the cells thereof.

Referring now to FIG. 1, the numeral 1 indicates a vent plug in accordance with the present invention which may be made of plastic or other suitable material. The body of the vent plug has a base portion 2 which is adapted to be secured in the filling well of a storage battery cover by means of the threads 3. As will be understood by those skilled in the art other suitable means of securing the vent plug 1 to a battery may be utilized. The upper portion of the vent plug body is provided with a horizontal water flow passage 4 which has a constriction or nozzle 5 therein. As shown, the horizontal passage 4 extends beyond the body of the vent plug 1 at 6 and 7. As will be explained in more detail hereinafter, the extensions 6 and 7 are provided to facilitate connection of the vent plug to a source of water and to other similar vent plugs. The extension 6 is adapted for the water input connection and the extension 7 is adapted as the water discharge connection.

A pair of vertical passages 8 and 9 extending through the base portions of the vent plug 2 connect the horizontal passages 4 with the cell compartment of the battery. As shown, the vertical passage 8 joins the water flow passage 4 on the input side of the nozzle 5. The vertical passage 9 connects with the water input passage 4 just below the termination of the nozzle 5 and projects beyond the base portion 2 of the vent plug at 11 to the desired electrolyte level. Mounted on the projection 1 of the vertical passage 9 is a cup 12 which has a plurality of perforation 13 at its base portion.

By means of the construction described above, the vent plug 1 is adapted to serve the dual purposes of venting gases generated during battery operation and as a means for adding water to the battery. In the latter function, the water input passage 4 is connected to a source of water as by means of a hose or tube. In this respect, it should be noted that the water input connections should be made in such a manner that the water flows from the extension 6 of the passage 4 to the extension 7. As water flows through the horizontal passage 4 some of it passes downward through the vertical passage 8 into the cell compartment of the battery to replenish the water lost from the electrolyte during battery operation. When the level of the electrolyte within the cell compartment rises to the bottom of extension 11 of the vertical passage 9, the aspirator formed by the nozzle 5 and the vertical passage 9, functions to draw off excess water which is supplied to the cell.

As will be understood by those skilled in the art, the operation of the nozzle 5 is such as to increase the velocity of the water flowing through the passage 4 causing a drop in pressure at the discharge end of the nozzle. This pressure drop draws the excess water upward through the passage 9 to be discharged with the water flowing through the passage 4. In this manner, the electrolyte is maintained at the level determined by the extension 11 of the vertical passage 9. When the electrolyte level reaches the bottom of the extension 11, the cup 12 functions to prevent the dilution of the electrolyte. In this respect it can be seen that water entering the cell compartment through the vertical input passage 8 enters the cup 12 and then flows into the electrolyte through perforations 13. When the electrolyte level rises to the bottom of the extensions 11, the excess water added is essentially confined to the area below the cell filling hole by the cup 12 to inhibit its immediate mixing with the electrolyte. Thus it primarily is this water rather than the electrolyte which is drawn out of the cell provided the flow rate of water into the cell is not such that its impact with the fluid in the cup will cause immediate and complete mixing.

Since the aspirator formed by the nozzle 5 and the vertical passage 9 draws air from the cell compartment until the electrolyte level within the cell compartment reaches the level of the extension 11, the water discharged from the water passage 4 will be aerated. Accordingly, when the discharge water no longer contains air bubbles, it is an indication that the electrolyte has reached the proper level making the further addition of water unnecessary.

As will be understood by those skilled in the art, the efficiency of the excess water removal system incorporated in the vent plug of the present invention is inherently limited. Accordingly, it has been found desirable to have the diameter of the water discharge passage 9 larger than the diameter of the vertical water input passage 8 in order that the amount of water that will be drawn out will be equal to the amount added when the desired level is reached. When the vent plug of the present invention functions to vent gases generated within the battery during operation, the vertical passage 8, which is above the electrolyte level serves as a gas escape vent. Gas escaping through the vertical passage 8 is discharged from the battery through the water input passage 4.

Referring now to FIG. 2, there is shown a plurality of vent plugs 1 in accordance with the present invention mounted in the filling wells 15 of a storage battery 16 and interconnected to facilitate the simultaneous filling of the cells thereof. As shown, the battery 16 has a plurality of cell compartments 17, 18 and 19 separated by the vertical partitions 21 and 22. Each of the cell compartments 17, 18 and 19 has a cell cover 23 having a vent well 15. As shown, a vent plug in accordance with the present invention has been screwed into each of the vent wells 15. The vent plugs 1 have been interconnected by means of tubes 24 and 25 which connect the discharge extension 7 of one vent plug to the input extension 6 of the adjoining vent plug. The input extension 6 of the first vent plug 1 is adapted to be connected to a source of water, not shown, by means of a tube 26 connected thereto. Similarly, a discharge tube 27 is shown connected to the discharge extension 7 of the last vent plug 1. When the vent plugs are interconnected in the manner described above, they are adapted to effect the simultaneous addition of water to the cells 17, 18 and 19 of the battery 16. When so interconnected, the vent plugs function in the manner described hereinbefore in connection with the operation of a single vent plug and thereby greatly facilitate the servicing of battery 16.

From the foregoing it can be seen that by means of the vent plug of the present invention periodic servicing required by a battery can be accomplished without the removal of any of the vent plugs from the battery. In addition, the vent plug of the present invention also prevents the addition of excess water and maintains the electrolyte at the proper level. As will be understood by those skilled in the art, the vent plugs may remain interconnected in the manner shown in FIG. 2 during battery operation. Gases developed during battery operation will be discharged into the atmosphere in the manner described hereinbefore through the vent plugs and connecting tubing.

While in the foregoing description the present invention has been described in connectoin with a vent plug, it should be understood that the structure described can be incorporated in a battery cover. Thus, it is within the scope of the present invention to provide a battery cover having a water flow passage extending therethrough, a pair of vertical passages leading to each cell compartment of the battery, and a constriction or nozzle between each pair of vertical passages. When such structure is incorporated into a battery cover the connections between the filling devices would be, of course, integral with the cover and eliminating the necessity for the connecting tubes described hereinbefore.

Having described the present invention what is claimed as new is:

1. A storage battery vent plug comprising a body having a base portion adapted to be secured in the filling well of a storage battery, a water flow passage adapted for connection with a source of water, a nozzle in said passage, a first vertical passage in said body adapted to connect said water flow passage with the cell compartment of a battery, and a second vertical passage in said body adapted to connect said water flow passage with the cell compartment of a battery, said second vertical passage joining said water flow passage at the discharge end of said nozzle.

2. Vent plug as specified in claim 1 wherein said second vertical passage has a diameter larger than the diameter of the first vertical passage.

3. A storage battery vent plug comprising, in combination, means for securing the vent plug in the vent well of a storage battery, a water flow passage having a water input end and a water discharge end, a first passage adapted to connect said water flow passage with the interior of the battery, a second passage adapted to connect said water flow passage with the interior of the battery, and means in said water flow passage to create a pressure drop adjacent to the junction of said second passage when water flows through water flow passage.

4. Vent plug as specified in claim 3 wherein said second passage extends to the desired battery electrolyte level.

5. Vent plug as specified in claim 3 including means for preventing dilution of electrolyte.

6. Vent plug as specified in claim 5 wherein said means for preventing dilution of electrolyte comprises a perforated cup.

7. Vent plug as specified in claim 3 wherein said second passage has a diameter larger than the diameter of the first passage.

8. A storage battery vent plug adapted to facilitate the addition of water to the battery comprising, in combination, a body having a base portion adapted to be secured in the vent well of a storage battery, a water flow passage in said body, a water input extension on said passage, a water discharge extension on said passage, a constriction in said water flow passage, a water input passage adapted to connect said water flow passage with the interior of the battery through said base portion, said water input passage joining said water flow passage on the water input side of said constriction, an excess water discharge passage adapted to connect said water flow passage with the interior of the battery through said base portion, said water discharge passage joining said water flow passage at the termination of said constriction to form an aspirator therewith, and an extension on said water discharge passage extending it to the desired electrolyte level.

9. Vent plug as specified in claim 8 wherein a perforated cup is mounted on said extension of the water discharge passage.

10. Vent plug as specified in claim 8 wherein said excess water discharge passage has a diameter larger than that of the water input passage.

11. Storage battery filling and venting means comprising, in combination, a water flow passage adapted for connection with a source of water, a nozzle in said passage, a first vertical passage in said body adapted to connect said water flow passage with the cell compartment of a battery, and a second vertical passage in said body adapted to connect said water flow passage with the cell compartment of a battery, said second vertical passage joining said water flow passage at the discharge end of said nozzle.

12. Means for venting and filling a plurality of storage battery cells comprising, a water flow passage adapted for connecting with a source of water, a plurality of first vertical passages, each of said first vertical passages being adapted to connect said water flow passage with one of said cell compartments, a plurality of second vertical passages, each of said second vertical passages being adapted to connect said water flow passage with one of said cell compartments and a plurality of nozzles in said water flow passage, each of said nozzles being located between one of said first and second vertical passages, each of said second vertical passages joining said water flow passage at the discharge end of its associate nozzle.

References Cited in the file of this patent

UNITED STATES PATENTS

| | | |
|---|---|---|
| 1,817,016 | Monckton | Aug. 4, 1931 |
| 1,837,242 | Van Meter | Dec. 22, 1931 |
| 1,878,223 | Woodbridge | Sept. 20, 1932 |
| 1,938,988 | Wallace | Dec. 12, 1933 |
| 1,996,843 | Van Meter | Apr. 9, 1935 |
| 2,104,672 | Ranier | Jan. 4, 1938 |